United States Patent
Jo et al.

(10) Patent No.: US 11,307,292 B2
(45) Date of Patent: Apr. 19, 2022

(54) ODM INFORMATION RELIABILITY DETERMINATION SYSTEM AND METHOD AND VEHICLE USING THE SAME

(71) Applicants: HYUNDAI MOTOR COMPANY, Seoul (KR); KIA MOTORS CORPORATION, Seoul (KR)

(72) Inventors: Su Min Jo, Hwaseong-si (KR); Ji Eun Won, Hwaseong-si (KR); Sang Bok Won, Seoul (KR); Min Kyun Yoo, Seoul (KR); Jae Pil Hwang, Seoul (KR); Woo Young Lee, Hwaseong-si (KR); Uk Il Yang, Yongin-si (KR); Hoon Lee, Gunpo-si (KR); Seul Ki Han, Seoul (KR); Bo Young Yun, Hwaseong-si (KR); Hyok Jin Chong, Suwon-si (KR); Hyung Sun Jang, Anyang-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 341 days.

(21) Appl. No.: 16/584,508

(22) Filed: Sep. 26, 2019

(65) Prior Publication Data
US 2020/0191907 A1 Jun. 18, 2020

(30) Foreign Application Priority Data
Dec. 12, 2018 (KR) .......................... 10-2018-0159959

(51) Int. Cl.
*G01S 7/40* (2006.01)
*G01S 13/931* (2020.01)

(52) U.S. Cl.
CPC .............. *G01S 7/40* (2013.01); *G01S 13/931* (2013.01); *G01S 2013/93271* (2020.01); *G01S 2013/93274* (2020.01)

(58) Field of Classification Search
CPC ..................... G01S 7/40; G01S 13/931; G01S 2013/93271; G01S 2013/93274;
(Continued)

(56) References Cited

U.S. PATENT DOCUMENTS

| | | | |
|---|---|---|---|
| 8,358,224 B2 * | 1/2013 | Seder | G01S 13/867 340/995.24 |
| 8,384,531 B2 * | 2/2013 | Szczerba | G01S 13/931 340/435 |

(Continued)

*Primary Examiner* — Brian E Miller
(74) *Attorney, Agent, or Firm* — McDonnell Boehnen Hulbert & Berghoff LLP

(57) ABSTRACT

Disclosed are an occupancy distance map (ODM) information reliability determination system and method and a vehicle using the same. The system includes a signal conversion unit configured to receive a plurality of sensing signals and to perform signal processing, a calculation unit configured to calculate state information of a nearby vehicle detected from processed signals, a sensor fusion track output unit configured to output sensor fusion track information based on the calculated state information of the nearby vehicle, an ODM output unit configured to output ODM information based on the calculated state information of the nearby vehicle, an ODM fusion unit configured to generate sensor fusion ODM information by performing sensor fusion with respect to the ODM information, and an ODM information reliability determination unit configured to determine reliability of the sensor fusion ODM information by confirming association between the sensor fusion track information and the sensor fusion ODM information.

17 Claims, 11 Drawing Sheets

(58) Field of Classification Search
CPC ...... G01S 13/42; G01S 13/584; G01S 13/878; G01S 13/89; B60W 40/02; B60W 40/105; B60W 50/14; B60W 2050/0057; B60W 2420/52; B60W 2520/10; B60W 2554/00; B60W 2554/80; B60R 21/0134
See application file for complete search history.

(56) References Cited

U.S. PATENT DOCUMENTS

| | | | | |
|---|---|---|---|---|
| 8,704,653 | B2 * | 4/2014 | Seder | G01S 13/723 |
| | | | | 340/461 |
| 8,781,688 | B2 * | 7/2014 | Sandblom | A61B 5/163 |
| | | | | 701/45 |
| 8,830,141 | B2 * | 9/2014 | Seder | G02B 1/113 |
| | | | | 345/7 |
| 9,026,300 | B2 * | 5/2015 | Ferguson | B60W 30/12 |
| | | | | 701/23 |
| 9,097,800 | B1 * | 8/2015 | Zhu | G01S 7/4802 |
| 9,632,210 | B2 * | 4/2017 | Zhu | G01S 17/87 |
| 10,538,242 | B2 * | 1/2020 | Noda | B60T 8/17 |
| 10,573,180 | B2 * | 2/2020 | Ito | B60W 30/09 |
| 2009/0135065 | A1 * | 5/2009 | Tsuchida | G01S 17/931 |
| | | | | 342/454 |
| 2010/0121575 | A1 * | 5/2010 | Aldridge | G08G 5/045 |
| | | | | 701/301 |
| 2010/0253539 | A1 * | 10/2010 | Seder | G01S 13/87 |
| | | | | 340/903 |
| 2012/0035846 | A1 * | 2/2012 | Sakamoto | G01S 13/867 |
| | | | | 701/301 |
| 2012/0083974 | A1 * | 4/2012 | Sandblom | A61B 5/18 |
| | | | | 701/45 |
| 2016/0223643 | A1 * | 8/2016 | Li | G01S 7/023 |
| 2017/0282915 | A1 * | 10/2017 | Kim | B60W 30/09 |
| 2019/0049958 | A1 * | 2/2019 | Liu | G01S 17/89 |
| 2019/0232955 | A1 * | 8/2019 | Grimm | B60W 50/06 |
| 2020/0055494 | A1 * | 2/2020 | Baba | B60Q 5/006 |
| 2020/0183003 | A1 * | 6/2020 | Lee | G01S 13/931 |
| 2020/0191907 | A1 * | 6/2020 | Jo | G01S 13/584 |
| 2020/0241131 | A1 * | 7/2020 | Kondo | G08G 1/16 |
| 2021/0107528 | A1 * | 4/2021 | Fujita | B60W 60/0011 |
| 2021/0129749 | A1 * | 5/2021 | Kang | B60W 50/14 |
| 2021/0387645 | A1 * | 12/2021 | Kim | B60W 30/09 |

* cited by examiner

| RH_Cnr_Rdr_Track | LH_Cnr_Rdr_Track | Frt_Rdr_Track | RH_Cnr_Rdr_ODM | LH_Cnr_Rdr_ODM | Frt_Rdr_ODM |
|---|---|---|---|---|---|

ODM INFORMATION RELIABILITY DETERMINATION SYSTEM AND METHOD AND VEHICLE USING THE SAME

CROSS REFERENCE TO RELATED APPLICATION

This application claims the benefit of Korean Patent Application No. 10-2018-0159959, filed on Dec. 12, 2018, which is hereby incorporated by reference as if fully set forth herein.

BACKGROUND

Field of the Disclosure

The present disclosure relates to an occupancy distance map (ODM) information reliability determination system, and more particularly to an ODM information reliability determination system and method, in which the reliability of ODM information is determined in order to respond to a low-speed close-range cut-in vehicle, and a vehicle using the same.

Discussion of the Related Art

In general, recently developed vehicles are intelligent vehicles that have improved fuel efficiency and performance as transportation means and that are capable of providing further improved safety and convenience using well-developed information and communication technology.

However, because intelligent vehicles are equipped with various devices performing additional functions, such as an entertainment system, an air purification device, and various other conveniences, a driver frequently operates these additional devices as well as devices for driving, which leads to careless driving and an increase in vehicle accidents.

Therefore, in recent years, studies on safety systems for preventing or avoiding vehicle collisions have been actively conducted.

Vehicle collision prevention systems may include an adaptive cruise control system, a forward vehicle collision warning system, a lane departure warning system, and the like. These vehicle collision prevention systems are mainly used for high speed driving to prevent major accidents, and primarily use technology of sensing obstacles a long distance from the vehicle in a high-speed driving state.

However, most traffic accidents, e.g. 70% or more of traffic accidents, actually occur at a low speed of about 30 km/h or less in a highly congested downtown area. Thus, conventional collision prevention systems are not suitable for preventing collisions by accurately recognizing vehicles that cut in at a low speed within a close range.

For example, in the case in which a vehicle cuts in at a low speed within a close range, noise may be included in lateral radar information, lateral radar information may not be accurately recognized, or the traveling state of the low-speed close-range cut-in vehicle may not be accurately recognized due to the occurrence of a coasting phenomenon. Thus, the conventional collision prevention system may erroneously determine the traveling state of the cut-in vehicle, and a vehicle collision may occur.

That is, the host vehicle may not be capable of accurately outputting the track data of the low-speed close-range cut-in vehicle in a congested expressway.

This is because the extraction of track signals is difficult due to excessive short-distance noise and because the determination of close-range cut-in is difficult due to inaccurate longitudinal/lateral/heading track information.

Recently, technology has been developed to respond to a low-speed close-range cut-in vehicle using occupancy distance map (ODM) information, which is obtained by outputting detection information, rather than track information of radar, in a grid map form.

However, because the ODM information uses detection level information of radar, the possibility of erroneous recognition is relatively high compared to the track information.

This is because the ODM information may be erroneously generated due to excessive noise under unfavorable conditions such as a road surface formed using steel plates or construction sites.

Therefore, there is a demand for development of an ODM information reliability determination system capable of responding to a low-speed close-range cut-in vehicle by determining the reliability of ODM information.

SUMMARY

Accordingly, the present disclosure is directed to an ODM information reliability determination system and method and a vehicle using the same that substantially obviate one or more problems due to limitations and disadvantages of the related art.

An object of the present disclosure is to provide an ODM information reliability determination system and method, in which the reliability of sensor fusion ODM information is determined by confirming the association between sensor fusion track information and sensor fusion ODM information, thereby accurately determining a low-speed close-range cut-in vehicle and consequently preventing vehicle collisions and increasing safety, and a vehicle using the same.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

In accordance with an aspect of the present disclosure, the above and other objects can be accomplished by the provision of an occupancy distance map (ODM) information reliability determination system including a signal conversion unit configured to receive a plurality of sensing signals and to perform signal processing, a calculation unit configured to calculate state information of a nearby vehicle detected from processed signals, a sensor fusion track output unit configured to output sensor fusion track information based on the calculated state information of the nearby vehicle, an ODM output unit configured to output ODM information based on the calculated state information of the nearby vehicle, an ODM fusion unit configured to generate sensor fusion ODM information by performing sensor fusion with respect to the ODM information, and an ODM information reliability determination unit configured to determine reliability of the sensor fusion ODM information by confirming association between the sensor fusion track information and the sensor fusion ODM information.

In accordance with another aspect of the present disclosure, there is provided an ODM information reliability determination method including receiving a plurality of sensing signals, processing the received sensing signals, calculating state information of a nearby vehicle detected from processed signals, outputting sensor track information and ODM information based on the calculated state information of the nearby vehicle, generating sensor fusion ODM information by performing sensor fusion with respect to the ODM information, and determining reliability of the sensor fusion ODM information by confirming association between the sensor fusion track information and the sensor fusion ODM information.

In accordance with a further aspect of the present disclosure, there is provided a computer-readable recording medium, in which a program for implementing the ODM information reliability determination method of the ODM information reliability determination system according to an embodiment of the present disclosure is recorded, the computer-readable recording medium performing the process provided by the ODM information reliability determination method.

In accordance with a still further aspect of the present disclosure, there is provided a vehicle including a sensing device configured to sense a nearby vehicle, and an ODM information reliability determination system configured to generate sensor fusion ODM information based on information of the nearby vehicle received from the sensing device and to determine reliability of the sensor fusion ODM information, the ODM information reliability determination system including a signal conversion unit configured to receive a plurality of sensing signals and to perform signal processing, a calculation unit configured to calculate state information of a nearby vehicle detected from processed signals, a sensor fusion track output unit configured to output sensor fusion track information based on the calculated state information of the nearby vehicle, an ODM output unit configured to output ODM information based on the calculated state information of the nearby vehicle, an ODM fusion unit configured to generate sensor fusion ODM information by performing sensor fusion with respect to the ODM information, and an ODM information reliability determination unit configured to determine reliability of the sensor fusion ODM information by confirming association between the sensor fusion track information and the sensor fusion ODM information.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

Figure 1:
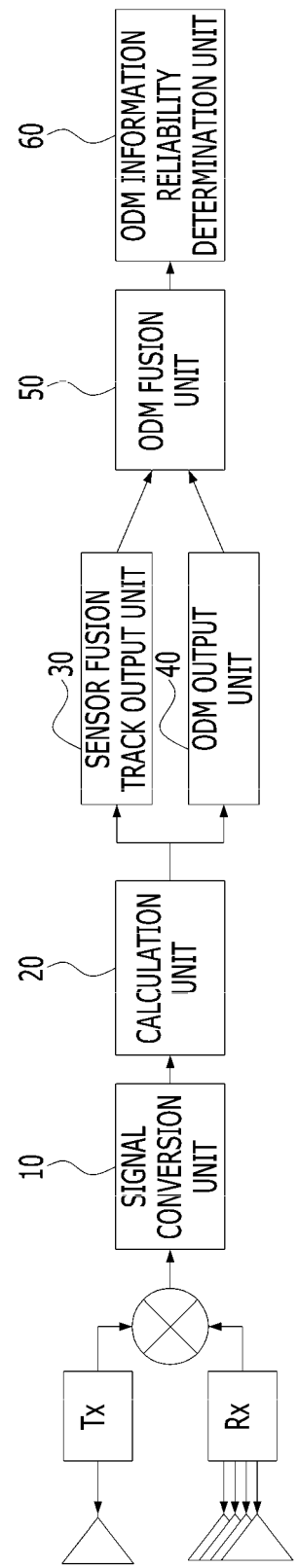
FIG. 1 is a block diagram showing an ODM information reliability determination system according to the present disclosure.

Hereinafter, embodiments of the present disclosure will be described in detail with reference to the accompanying drawings so as for those skilled in the art to easily carry out the embodiments. The present disclosure may, however, be embodied in many different forms, and should not be construed as being limited to the embodiments set forth herein. In the drawings, parts irrelevant to description of the present disclosure will be omitted for clarity. Like reference numerals refer to like elements throughout the specification.

Throughout the specification, unless explicitly described to the contrary, the word "include" and variations such as "includes" or "including" will be understood to imply the inclusion of stated elements but not the exclusion of any other elements. In addition, the terms "-er", "-or" and "module" used in the specification mean units for processing at least one function and operation and can be implemented by hardware components or software components and combinations thereof.

Throughout the specification, unless explicitly described to the contrary, the word "include" and variations such as "includes" or "including" will be understood to imply the inclusion of stated elements but not the exclusion of any other elements. In addition, the same reference numerals used throughout the specification refer to the same constituent elements.

Hereinafter, an ODM information reliability determination system and method and a vehicle using the same according to the embodiments of the present disclosure will be described in detail with reference to FIGS. 1 to 10.

FIG. 1 is a block diagram showing an ODM information reliability determination system according to the present disclosure.

As shown in FIG. 1, the ODM information reliability determination system according to the present disclosure may include a signal conversion unit 10, a calculation unit 20, a sensor fusion track output unit 30, an ODM output unit 40, an ODM fusion unit 50, and an ODM information reliability determination unit 60.

Here, the signal conversion unit 10 may receive a plurality of sensing signals and may perform signal processing.

The signal conversion unit 10 may receive a plurality of sensing signals from forward radar and lateral radar of the host vehicle.

The calculation unit 20 may calculate state information of a nearby vehicle, which is detected from the processed signals.

Here, when calculating the detected state information of a nearby vehicle, the calculation unit 20 may calculate detected distance information, speed information and angle information of a nearby vehicle.

For example, when calculating the detected distance information of a nearby vehicle, the calculation unit 20 may calculate the distance information based on the delay time of a frequency modulated continuous wave (FMCW), without limitation thereto.

In another example, when calculating the detected speed information of a nearby vehicle, the calculation unit 20 may calculate the speed information based on a Doppler frequency, without limitation thereto.

In still another example, when calculating the detected angle information of a nearby vehicle, the calculation unit 20 may calculate the angle information based on digital beamforming, without limitation thereto.

The sensor fusion track output unit 30 may output sensor fusion track information based on the calculated state information of a nearby vehicle.

Subsequently, the ODM output unit 40 may output occupancy distance map (ODM) information, which includes a grid map corresponding to a vehicle detection region and an ODM object having a plurality of detection points, based on the calculated state information of a nearby vehicle.

When outputting the ODM information, the ODM output unit 40 may output a grid map, in which a forward-longitudinal direction region and a lateral direction region are divided into six regions, a longitudinal position, a lateral position, a longitudinal speed, a flag indicating presence, and probability information at a predetermined speed or less of the host vehicle.

For example, when outputting the ODM information, the ODM output unit 40 may output a grid map when the speed of the host vehicle ranges from about 20 kph (kilometers per hour) to about 30 kph.

The grid map may have a length of about 15 m to about 25 m in the forward-longitudinal direction of the host vehicle and a width of about 4 m to about 5 m in the lateral direction of the host vehicle.

In addition, when outputting the ODM information, the ODM output unit 40 may generate a grid map corresponding to the vehicle detection region based on lane information.

Here, the lane information may be extracted from information received from a navigation system or a forward camera.

For example, the grid map may include two internal regions, two first external regions, and two second external regions.

The width of one of the internal regions may be calculated using the following equation: IR=vehicle width/2+α (where IR (Internal Region) represents a width of the internal region and α represents a margin value considering side mirrors).

Here, the width of the vehicle may be changed depending on the dimensions of the host vehicle, and α may range from about 0.5 m to about 1.5 m, without limitation thereto.

The width of one of the first external regions may be calculated using the following equation: ER1=lane width/2−IR (where ER1 (External Region) represents a width of the first external region and IR represents a width of the internal region).

Here, the width of a lane may range from about 3 m to about 4 m, without limitation thereto.

The width of one of the second external regions may range from about 0.2 m to about 0.8 m.

The length of the internal region may be the same as the length of each of the first and second external regions.

For example, the length of each of the internal region and the first and second external regions may range from about 15 m to about 25 m in the forward direction from the front surface of the host vehicle.

Also, specifications for each region in the grid map can be varied according to a vehicle type and a sensor specification.

Depending on the embodiment, the length of the internal region may be less than the length of each of the first and second external regions.

For example, the length of the internal region may range from about 15 m to about 25 m in the forward direction from the front surface of the host vehicle.

The length of each of the first and second external regions may be the sum of a first length, which ranges from about 15 m to about 25 m in the forward direction from the front surface of the host vehicle, and a second length, which ranges from about 0.5 m to about 1.0 m in the backward direction from the front surface of the host vehicle.

The area of the grid map may be changed depending on the speed of the host vehicle.

For example, the area of the grid map may increase as the speed of the host vehicle increases.

When outputting the ODM information, the ODM output unit 40 may generate a plurality of detection points based on effective detection information received from the forward radar and the lateral radar of the host vehicle, and may generate at least one ODM object by clustering a group of detection points, which is determined to be an object or a vehicle, among the plurality of detection points located within the grid map.

Here, the effective detection information received from the forward radar and the lateral radar of the host vehicle may include distance information, speed information, angle information, and signal intensity information.

When generating at least one ODM object, the ODM output unit 40 may form an ODM object from the detection points having the same properties at every cycle.

Here, the same properties may include a longitudinal position, a lateral position, an angle, a distance, an absolute speed, and a relative speed.

Further, when generating at least one ODM object, the ODM output unit 40 may manage the detection points, which are determined to be an ODM object, in a history region at every cycle, and may change the maximum maintenance time of the detection points depending on the history maintenance condition.

Here, when generating at least one ODM object, the ODM output unit 40 may determine the output value including the longitudinal and lateral distances and the longitudinal speed of the ODM object based on the hysteresis in each region of the grid map.

When generating the sensor fusion ODM information, the ODM fusion unit 50 may generate the sensor fusion ODM information in consideration of the accuracy of the sensor in each sensing region thereof.

For example, the ODM fusion unit 50 may output ODM information of the left radar as the sensor fusion ODM information within the sensing region of the sensor, which ranges from −0.8 m to 10 m from the host vehicle in the longitudinal direction thereof and ranges from −2.2 m to −0.5 m from the host vehicle in the lateral direction thereof.

In another example, the ODM fusion unit 50 may output ODM information of the forward radar as the sensor fusion ODM information within the sensing region of the sensor, which ranges from −0.8 m to 10 m from the host vehicle in the longitudinal direction thereof and ranges from −0.5 m to 0.5 m from the host vehicle in the lateral direction thereof.

In still another example, the ODM fusion unit 50 may output ODM information of the right radar as the sensor fusion ODM information within the sensing region of the sensor, which ranges from −0.8 m to 10 m from the host vehicle in the longitudinal direction thereof and ranges from 0.5 m to 2.2 m from the host vehicle in the lateral direction thereof.

In still another example, the ODM fusion unit 50 may output ODM information of the forward radar as the sensor fusion ODM information within the sensing region of the sensor, which ranges from 10 m to 20 m from the host vehicle in the longitudinal direction thereof and ranges from −2.2 m to 2.2 m from the host vehicle in the lateral direction thereof.

When confirming the association between the sensor fusion track information and the sensor fusion ODM information, the ODM information reliability determination unit 60 may generate association information by confirming the association between the sensor fusion track information and the sensor fusion ODM information.

Here, the association information may be generated as a 6-bit signal, which includes right radar track information, left radar track information, forward radar track information, right radar ODM information, left radar ODM information, and forward radar ODM information.

According to a first embodiment, when the association information is such that both the forward radar ODM information and the lateral radar ODM information are present within the forward radar sensing region, the ODM information reliability determination unit 60 may select the forward radar ODM information as a highly reliable target.

According to a second embodiment, when the association information is such that only the lateral radar ODM information is present within the forward radar sensing region, the ODM information reliability determination unit 60 may select the forward radar ODM information as a highly reliable target.

Here, when the association information is such that, within the first radar sensing region, the first radar ODM information of the same sensor is not present but the second radar ODM information of another sensor is present, the ODM information reliability determination unit 60 may select the second radar ODM information of another sensor as a highly reliable target.

According to a third embodiment, when the association information is such that both the forward radar ODM information and the lateral radar ODM information are present within the lateral radar sensing region, the ODM information reliability determination unit 60 may select the lateral radar ODM information as a highly reliable target.

According to a fourth embodiment, when the association information is such that only the forward radar ODM information is present within the lateral radar sensing region, the ODM information reliability determination unit 60 may select the forward radar ODM information as a highly reliable target.

Here, when the association information is such that, within the first radar sensing region, the first radar ODM information of the same sensor is not present but the second radar ODM information of another sensor is present, the ODM information reliability determination unit 60 may select the second radar ODM information of another sensor as a highly reliable target.

According to a fifth embodiment, when the association information is such that the radar track information and the radar ODM information are present within the radar sensing region and such that the radar ODM information is present within a gate having a specific size on the basis of the radar track information, the ODM information reliability determination unit 60 may select the radar ODM information present within the gate as a highly reliable target.

Here, when the association information is such that only the forward radar ODM information is present within the forward radar sensing region and such that the forward radar ODM information is present within a gate having a specific size on the basis of the lateral radar track information, the ODM information reliability determination unit 60 may select the forward radar ODM information present within the gate as a highly reliable target.

According to a sixth embodiment, when the association information is such that the forward radar ODM information and the lateral radar ODM information are present within the forward radar sensing region, such that the forward radar ODM information and the lateral radar ODM information are not present within a gate having a specific size on the basis of the forward radar track information and such that the forward radar ODM information and the lateral radar ODM information are present within a gate having a specific size on the basis of the lateral radar track information, if the forward radar ODM information present within the gate is located closer to the lateral radar track information than the lateral radar ODM information, the ODM information reliability determination unit 60 may select the forward radar ODM information as a highly reliable target.

As described above, the present disclosure confirms the association between the sensor fusion track information and the sensor fusion ODM information and determines the reliability of the sensor fusion ODM information, thereby accurately determining a low-speed close-range cut-in vehicle. Therefore, it is possible to prevent vehicle collisions and to increase safety.

Further, in a congested expressway, the present disclosure is capable of responding to a low-speed close-range cut-in vehicle by outputting detection information of the radar in a grid map form.

Still further, the present disclosure is capable of outputting five pieces of information, which include a longitudinal position, a lateral position, a longitudinal speed, a flag indicating presence, and probability information, by dividing the forward-longitudinal direction region (about 20 m) and the lateral direction region (about ±2.2 m) into six regions when the speed of the host vehicle is about 30 kph or less using the ODM output based on the detection level, rather than the track level.

Still further, the present disclosure is capable of generating sensor fusion ODM information using ODM information depending on the accuracy of the forward radar sensing region and the lateral radar sensing region.

Still further, the present disclosure is capable of determining the reliability of the sensor fusion ODM information by confirming the association between track information of another sensor and ODM information.

Still further, the present disclosure is capable of estimating heading information of a cut-in vehicle using ODM output information corresponding to the internal and external regions of the grid map, and is also capable of determining the extent to which the cut-in vehicle enters the lane of the host vehicle using the estimated information.

Still further, the present disclosure is capable of responding to a low-speed close-range cut-in vehicle using ODM information even when the longitudinal/lateral position and heading information of the sensor fusion track is not accurate, thereby preventing vehicle collisions and increasing safety.

Figure 2:
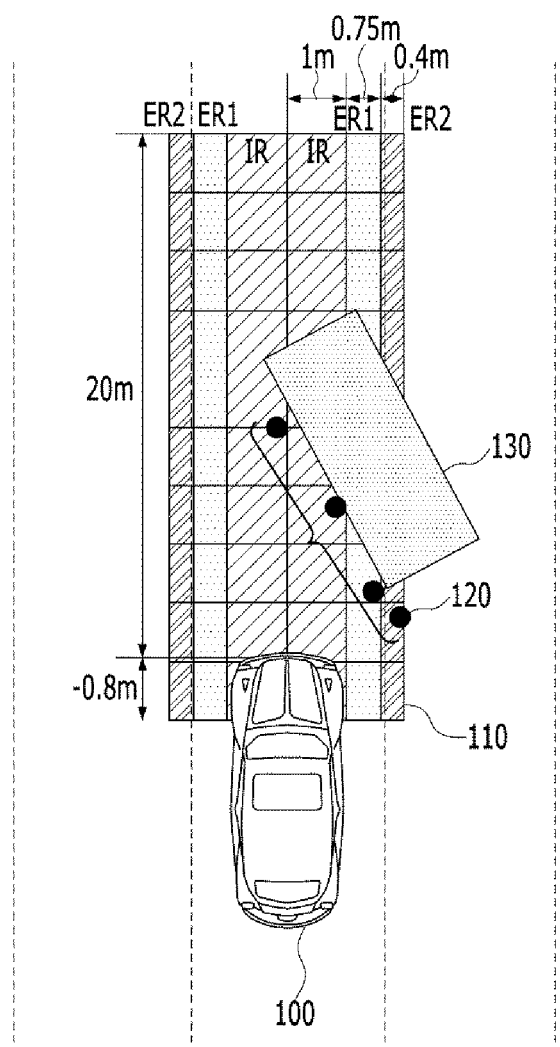
FIG. 2 is a view showing a grid map of ODM information.

FIG. 2 is a view showing a grid map of ODM information.

As shown in FIG. 2, the present disclosure may output ODM information, which includes a grid map 110 corresponding to a vehicle detection region and an ODM object 120 having a plurality of detection points.

Thus, the present disclosure is capable of responding to a low-speed close-range cut-in vehicle using ODM information even when the longitudinal/lateral position and heading information of a sensor fusion track 130 are not accurate, thereby preventing vehicle collisions and increasing safety.

The present disclosure may output the grid map 110 when the speed of a host vehicle 100 ranges from about 20 kph to about 30 kph.

Here, the grid map may have a length of about 15 m to about 25 m in the forward-longitudinal direction of the host vehicle 100 and a width of about 4 m to about 5 m in the lateral direction of the host vehicle 100.

In addition, the present disclosure may generate the grid map 110 corresponding to the vehicle detection region based on lane information.

Here, the lane information may be extracted from information received from a navigation system or a forward camera.

For example, the grid map 110 may include two internal regions IR, two first external regions ER1, and two second external regions ER2.

The width of one of the internal regions IR may be calculated using the following equation: IR=vehicle width/2+α (where IR represents a width of the internal region and α represents a margin value considering side mirrors).

Here, the width of the vehicle may be changed depending on the dimensions of the host vehicle 100, and α may range from about 0.5 m to about 1.5 m, without limitation thereto.

The width of one of the first external regions ER1 may be calculated using the following equation: ER1=lane width/2−IR (where ER1 represents a width of the first external region and IR represents a width of the internal region).

Here, the width of a lane may range from about 3 m to about 4 m, without limitation thereto.

The width of one of the second external regions ER2 may range from about 0.2 m to about 0.8 m.

The length of the internal region IR may be the same as the length of each of the first and second external regions ER1 and ER2.

For example, the length of each of the internal region IR and the first and second external regions ER1 and ER2 may range from about 15 m to about 25 m in the forward direction from the front surface of the host vehicle 100. Depending on the embodiment, the length of the internal region IR may be less than the length of each of the first and second external regions ER1 and ER2.

For example, the length of the internal region IR may range from about 15 m to about 25 m in the forward direction from the front surface of the host vehicle 100.

The length of each of the first and second external regions ER1 and ER2 may be the sum of a first length, which ranges from about 15 m to about 25 m in the forward direction from the front surface of the host vehicle 100, and a second length, which ranges from about 0.5 m to about 1.0 m in the backward direction from the front surface of the host vehicle 100.

The area of the grid map 110 may be changed depending on the speed of the host vehicle 100.

For example, the area of the grid map 110 may increase as the speed of the host vehicle 100 increases.

Also, specifications for each region in the grid map can be varied according to a vehicle type and a sensor specification.

Figure 3:
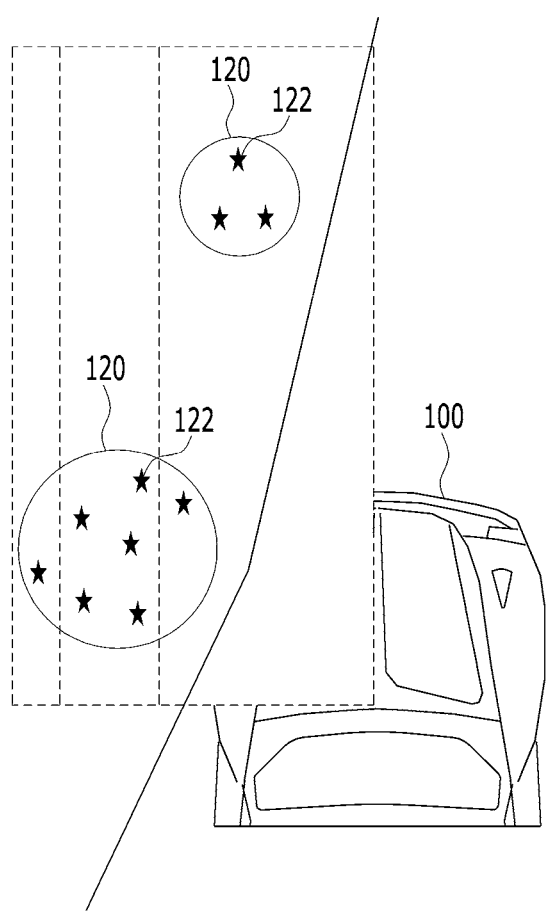
FIG. 3 is a view showing an ODM object detection method.

FIG. 3 is a view showing an ODM object detection method.

As shown in FIG. 3, the present disclosure may output ODM information, which includes the ODM object 120 having a plurality of detection points 122.

Here, among the detection information from the radar, only effective detection information may be used as the detection points 122.

For example, the detection information used for ODM determination may include distance/speed/angle/signal intensity information.

The ODM object 120 may be a detection group, which is determined to be an object or a vehicle as a cluster.

The ODM object 120 may trace an object that is moving or stationary using the detection information output from the interior of the ODM region.

That is, the present disclosure may generate a plurality of detection points 122 based on effective detection information received from the forward radar and the lateral radar of the host vehicle 100, and may generate at least one ODM object 120 by clustering a group of detection points, which is determined to be an object or a vehicle, among the plurality of detection points 122 located within the grid map.

Here, the effective detection information received from the forward radar and the lateral radar of the host vehicle 100 may include distance information, speed information, angle information, and signal intensity information.

The present disclosure may form the ODM object 120 from the detection points 122 having the same properties at every cycle.

Here, the same properties may include a longitudinal position, a lateral position, an angle, a distance, an absolute speed, and a relative speed.

The present disclosure may manage the detection points 122, which are determined to be an ODM object 120, in a history region at every cycle, and may change the maximum maintenance time of the detection points 122 depending on the history maintenance condition.

Here, the present disclosure may determine the output value including the longitudinal and lateral distances and the longitudinal speed of the ODM object 120 based on the hysteresis in each region of the grid map.

Figure 4:
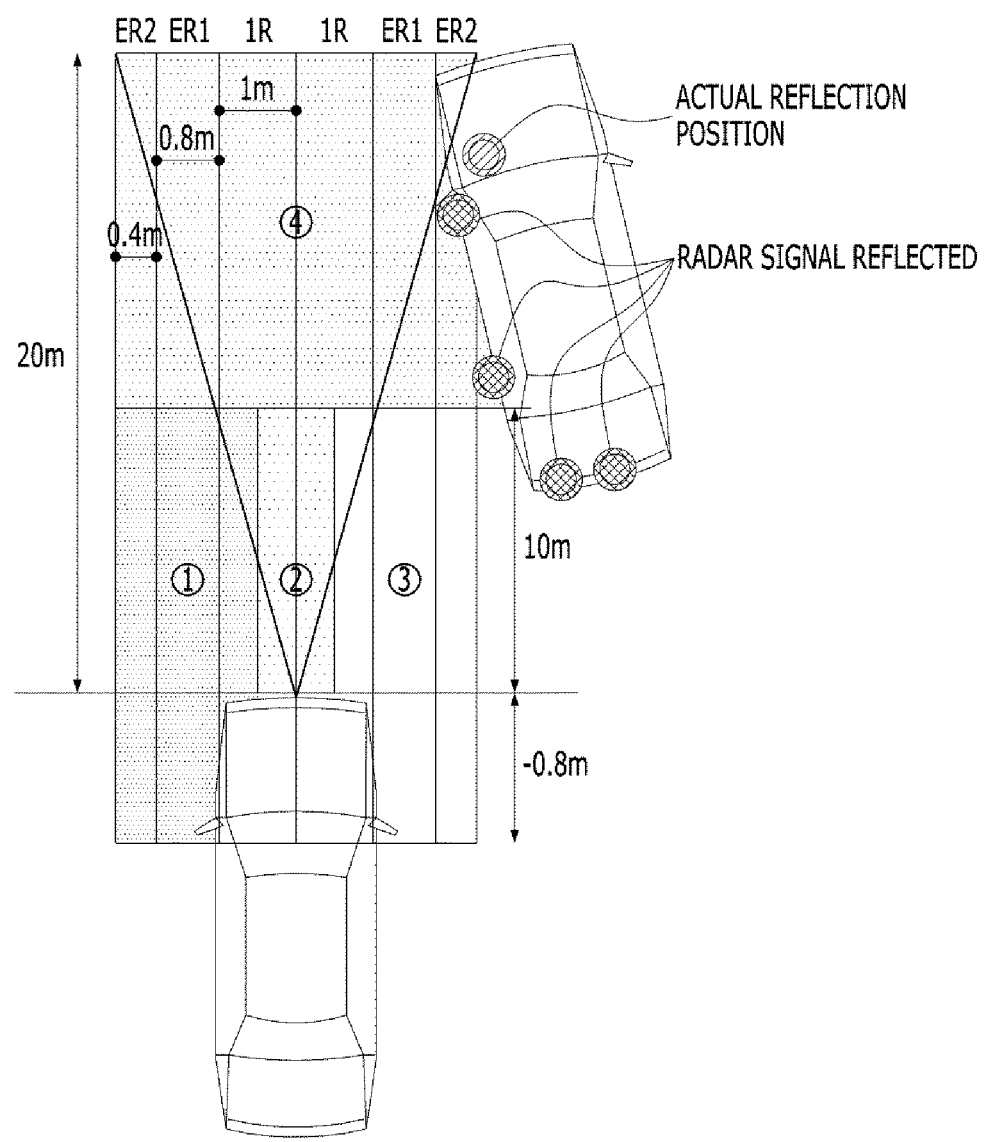
FIG. 4 is a view showing the generation of sensor fusion ODM information in consideration of the accuracy of a sensor in each sensing region thereof.

FIG. 4 is a view showing the generation of sensor fusion ODM information in consideration of the accuracy of the sensor in each sensing region thereof.

As shown in FIG. 4, when generating the sensor fusion ODM information, the present disclosure may generate the sensor fusion ODM information in consideration of the accuracy of the sensor in each sensing region thereof.

For example, the present disclosure may output ODM information of the left radar as the sensor fusion ODM information, which is a reference ODM, within a first sensing region of the sensor, which ranges from −0.8 m to 10 m from the host vehicle in the longitudinal direction thereof and ranges from −2.2 m to −0.5 m from the host vehicle in the lateral direction thereof.

In another example, the present disclosure may output ODM information of the forward radar as the sensor fusion ODM information, which is a reference ODM, within a second sensing region of the sensor, which ranges from −0.8 m to 10 m from the host vehicle in the longitudinal direction thereof and ranges from −0.5 m to 0.5 m from the host vehicle in the lateral direction thereof.

In still another example, the present disclosure may output ODM information of the right radar as the sensor fusion ODM information, which is a reference ODM, within a third sensing region of the sensor, which ranges from −0.8 m to 10 m from the host vehicle in the longitudinal direction thereof and ranges from 0.5 m to 2.2 m from the host vehicle in the lateral direction thereof.

In still another example, the present disclosure may output ODM information of the forward radar as the sensor fusion ODM information, which is a reference ODM, within a fourth sensing region of the sensor, which ranges from 10 m to 20 m from the host vehicle in the longitudinal direction thereof and ranges from −2.2 m to 2.2 m from the host vehicle in the lateral direction thereof.

The reason why the sensing region within which the sensor fusion ODM, which is a reference ODM, is variably determined is sectioned into distances of about 10 m from the host vehicle in the forward direction is the limit of the ODM of the lateral radar.

That is, the raw data of the lateral radar, which includes the rear surfaces, the lateral surfaces and the corners of the preceding vehicle and the vehicle in the next lane, may be changed in position depending on the position of the radar signal reflected from the target vehicle.

In particular, as the distance from the lateral radar increases, the range within which the signal is reflected decreases, and the amount of raw data is reduced. Thus, the use of the data is restricted.

Here, due to the intermittent change of the raw data, misrecognition or non-recognition of the lateral radar ODM with respect to the target vehicle, which is located in the forward and lateral ODM boundary regions ER2 and ER1, may occur.

Further, the reason why the sensing region within which the sensor fusion ODM, which is a reference ODM, is variably determined is sectioned into distances of about 10 m from the host vehicle in the forward direction is the sensing accuracy of the forward radar.

That is, the forward radar may have relatively high sensing accuracy with respect to an object located within a range from −10°±1.0° to 10°±1.0°.

Further, the forward radar may have relatively high sensing accuracy with respect to an object located at a distance of about 10 m ahead of the host vehicle or located within a range of 10 m±1.76 m (when the width of a lane of an expressway is about 1.75 m).

Further, since the radio signal generated from the forward radar has higher straightness than the radio signal from the lateral radar, the forward radar may have higher sensing accuracy with respect to an object located at a long distance than the lateral radar.

Figures 5, 6:
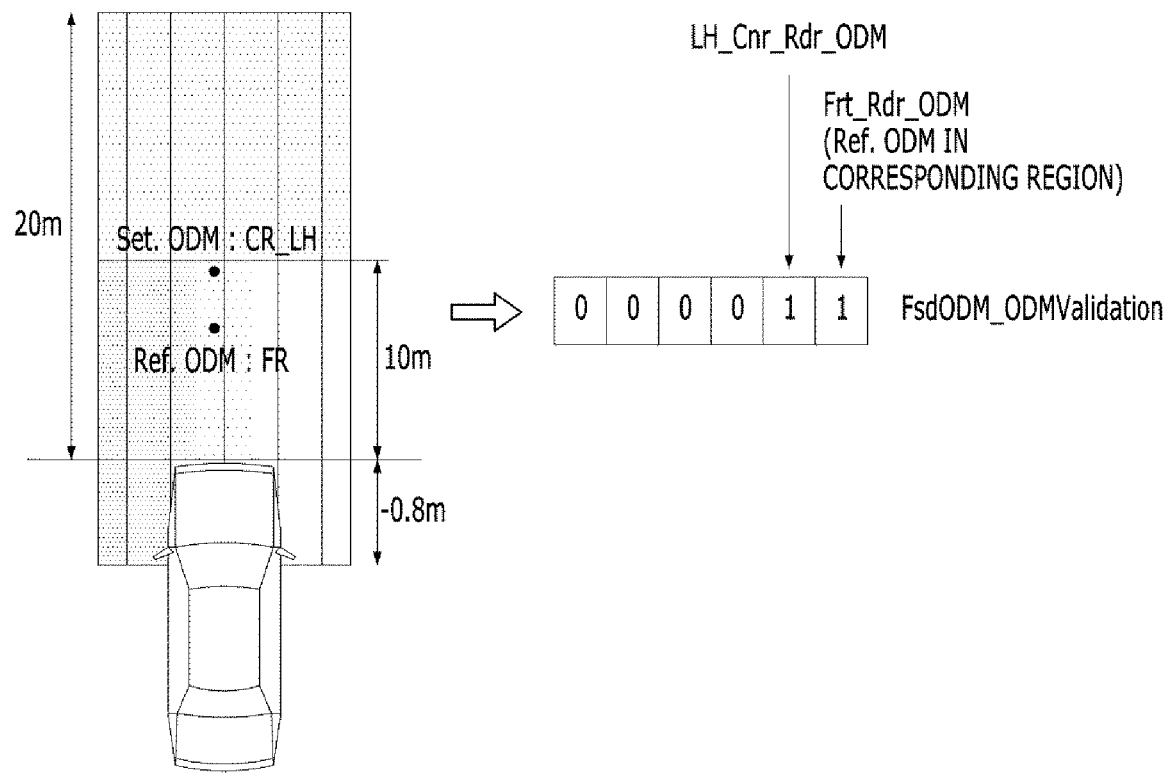
FIG. 5 is a diagram showing the configuration of association information corresponding to the association between sensor fusion track information and sensor fusion ODM information.
FIGS. 6, 7, 8, 9, 10, and 11 are views showing a process of determining reliability of sensor fusion ODM information.

FIG. 5 is a diagram showing the configuration of association information corresponding to the association between the sensor fusion track information and the sensor fusion ODM information.

As shown in FIG. 5, the present disclosure may generate association information by confirming the association between the sensor fusion track information and the sensor fusion ODM information.

Here, the association information may be generated as a 6-bit signal, which includes right radar track information RH_Cnr_Rdr_Track, left radar track information LH_Cnr_Rdr_Track, forward radar track information Frt_Rdr_Track, right radar ODM information RH_Cnr_Rdr_ODM, left radar ODM information LH_Cnr_Rdr_ODM, and forward radar ODM information Frt_Rdr_ODM.

The present disclosure may output a signal FsdODM_ODMValidation for determining the reliability of the sensor fusion ODM.

Further, the present disclosure may additionally output an information signal about the association between the sensor fusion ODM and other information (ODM and sensor track).

Still further, the present disclosure may output a 6-bit signal in response to the association between the ODM information and the sensor track information.

The reason for outputting a 6-bit signal is to additionally provide ODM information of other sensors associated with the output sensor fusion ODM and sensor track information, thereby additionally determining whether a sensor ODM or a sensor track having high importance is present in a corresponding scenario among the scenarios corresponding to the respective control systems and utilizing the determination result for more reliable selection of a target.

FIGS. 6 to 11 are views showing the process of determining the reliability of sensor fusion ODM information.

Examples of an ODM information reliability determination scenario will be described below with reference to FIGS. 6 to 11.

As shown in FIG. 6, when the association information is such that both the forward radar ODM information Frt_Rdr_ODM and the lateral radar ODM information LH_Cnr_Rdr_ODM are present within the sensing region of the forward radar FR, the ODM information reliability determination scenario according to the first embodiment may select the forward radar ODM information Frt_Rdr_ODM, which is reference ODM information in the corresponding sensing region, as a highly reliable target.

Figure 7:
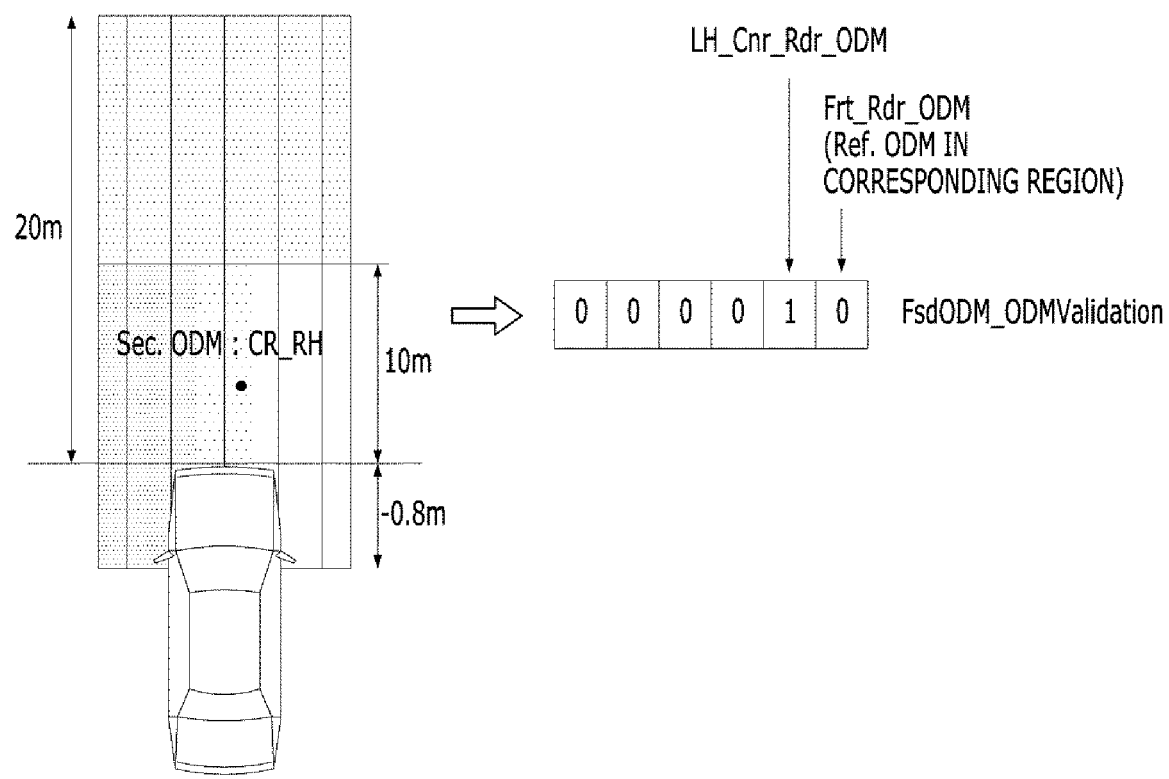

As shown in FIG. 7, when the association information is such that only the lateral radar ODM information LH_Cnr_Rdr_ODM is present within the sensing region of the forward radar FR, the ODM information reliability determination scenario according to the second embodiment may select the forward radar ODM information Frt_Rdr_ODM as a highly reliable target.

Here, when the association information is such that, within the first radar sensing region, the first radar ODM information of the same sensor is not present but the second radar ODM information of another sensor is present, the present disclosure may select the second radar ODM information of the other sensor as a highly reliable target.

Figure 8:
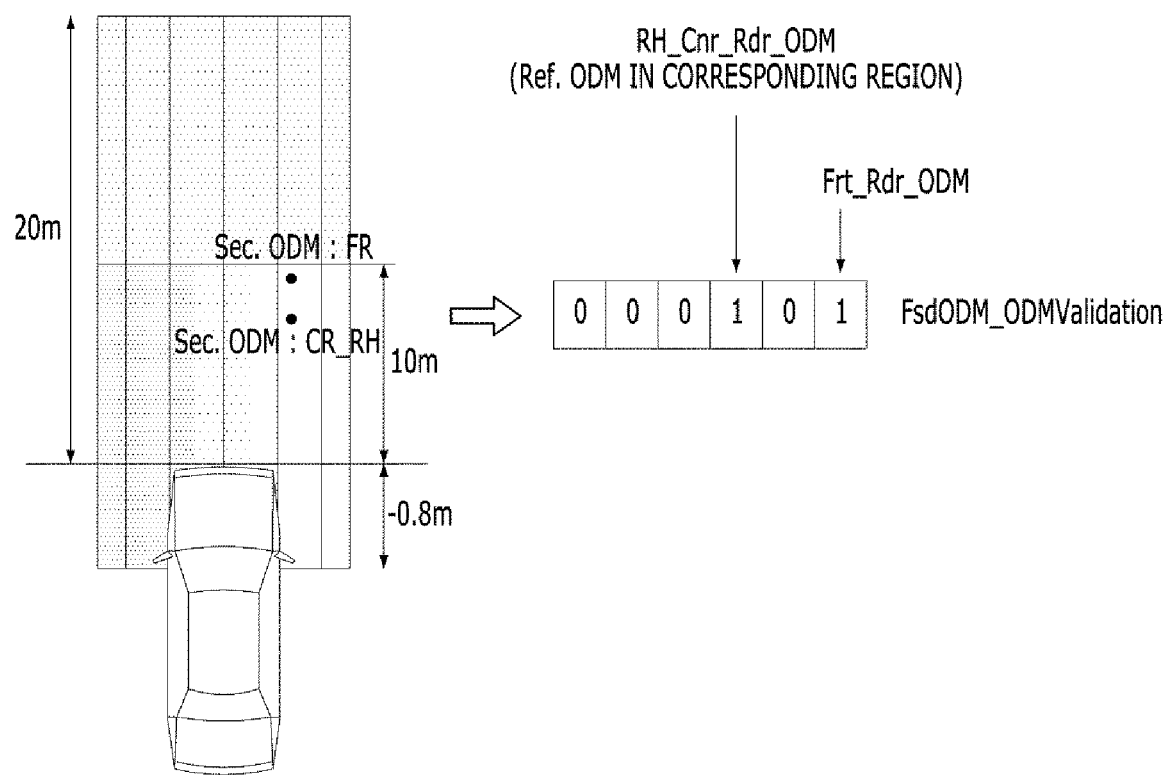

As shown in FIG. 8, when the association information is such that both the forward radar ODM information Frt_Rdr_ODM and the lateral radar ODM information RH_Cnr_Rdr_ODM are present within the sensing region of the lateral radar CR, the ODM information reliability determination scenario according to the third embodiment may select the lateral radar ODM information RH_Cnr_Rdr_ODM, which is reference ODM information in the corresponding sensing region, as a highly reliable target.

Figure 9:
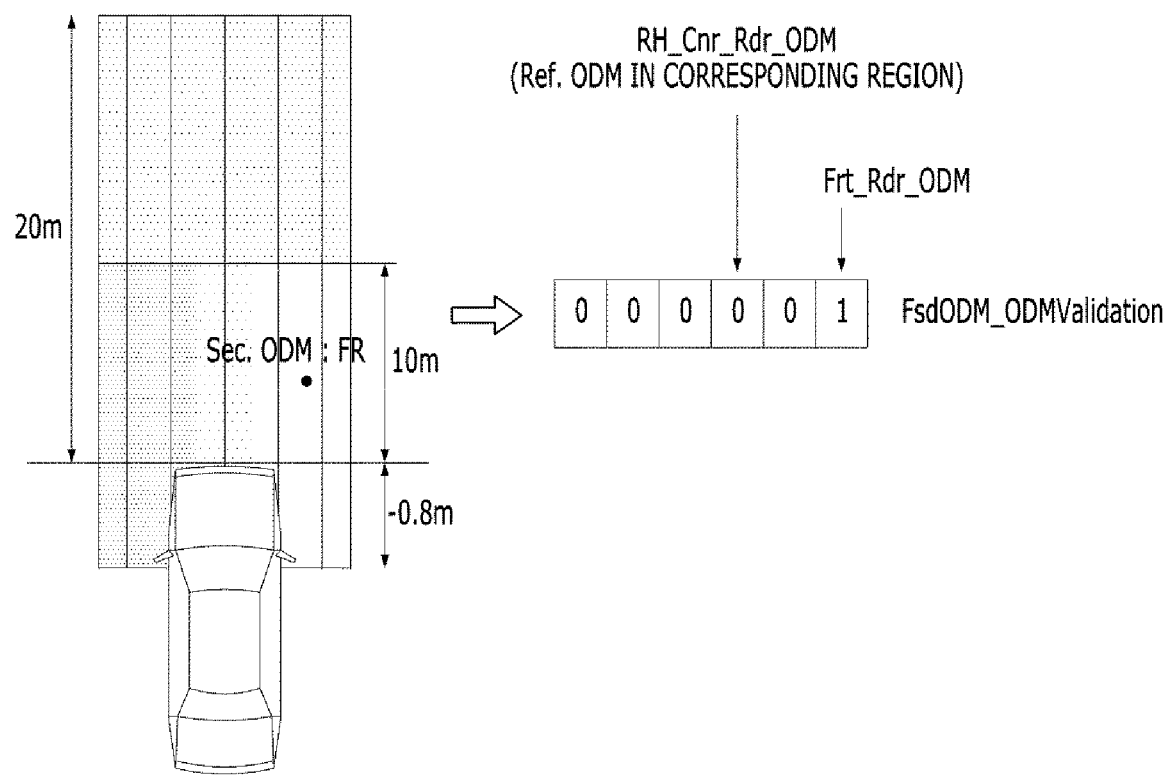

As shown in FIG. 9, when the association information is such that only the forward radar ODM information Frt_Rdr_ODM is present within the sensing region of the lateral radar CR, the ODM information reliability determination scenario according to the fourth embodiment may select the forward radar ODM information Frt_Rdr_ODM as a highly reliable target.

Here, when the association information is such that, within the first radar sensing region, the first radar ODM information of the same sensor is not present but the second radar ODM information of another sensor is present, the present disclosure may select the second radar ODM information of the other sensor as a highly reliable target.

Figure 10:
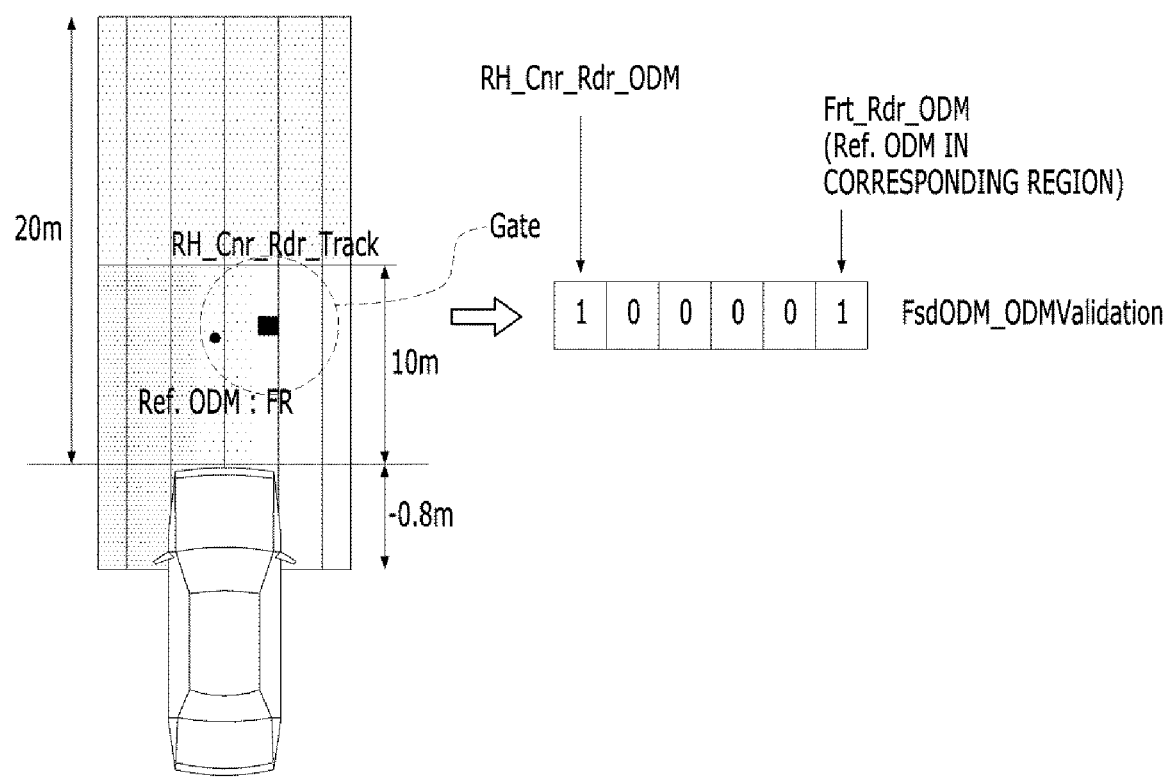

As shown in FIG. 10, when the association information is such that the radar track information and the radar ODM information are present within the radar sensing region and such that the radar ODM information is present within a gate having a specific size on the basis of the radar track information, the ODM information reliability determination scenario according to the fifth embodiment may select the radar ODM information present within the gate as a highly reliable target.

Here, when the association information is such that only the forward radar ODM information Frt_Rdr_ODM is present within the sensing region of the forward radar FR and such that the forward radar ODM information Frt_Rdr_ODM is present within a gate having a specific size on the basis of the lateral radar track information RH_Cnr_Rdr_Track, the present disclosure may select the forward radar ODM information Frt_Rdr_ODM present within the gate as a highly reliable target.

Figure 11:
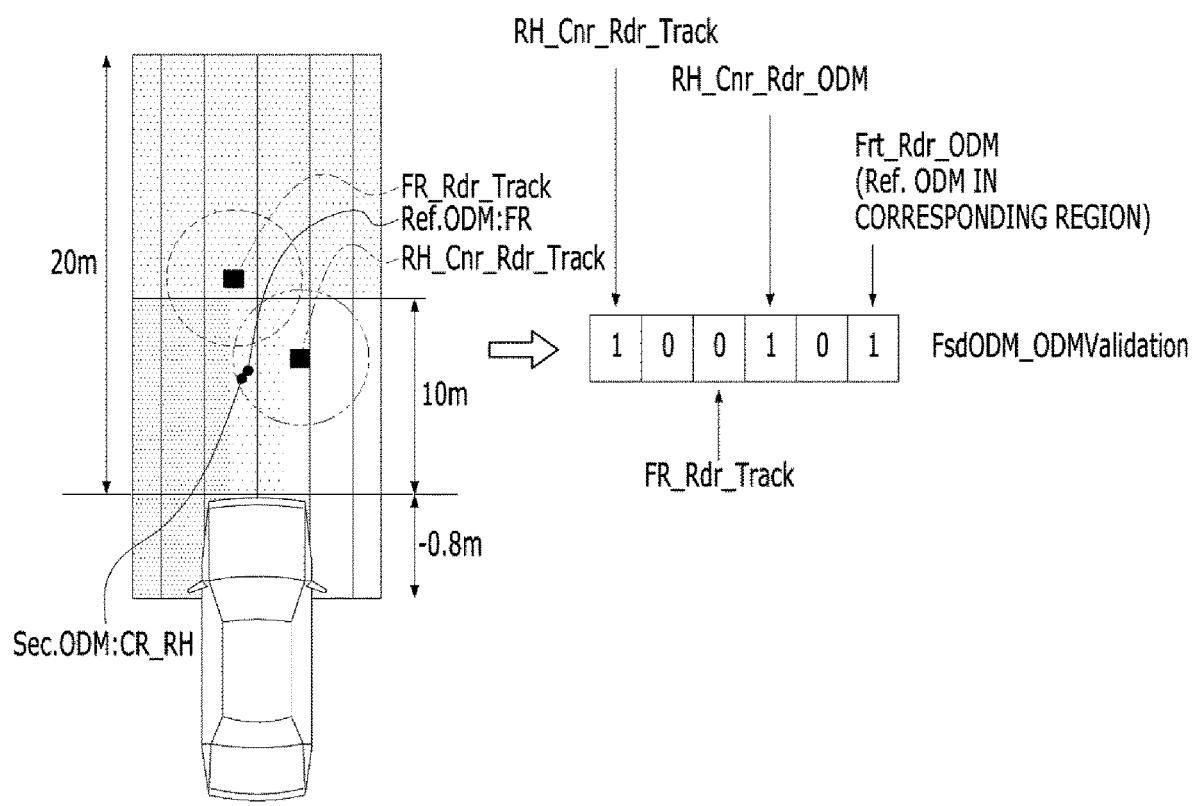

As shown in FIG. 11, when the association information is such that the forward radar ODM information Frt_Rdr_ODM and the lateral radar ODM information RH_Cnr_Rdr_ODM are present within the sensing region of the forward radar FR, such that the forward radar ODM information Frt_Rdr_ODM and the lateral radar ODM information RH_Cnr_Rdr_ODM are not present within a gate having a specific size on the basis of the forward radar track information Frt_Rdr_TRACK and such that the forward radar ODM information Frt_Rdr_ODM and the lateral radar ODM information RH_Cnr_Rdr_ODM are present within a gate having a specific size on the basis of the lateral radar track information RH_Cnr_Rdr_Track, if the forward radar ODM information Frt_Rdr_ODM present within the gate is located closer to the lateral radar track information RH_Cnr_Rdr_Track than the lateral radar ODM information RH_Cnr_Rdr_ODM, the ODM information reliability determination scenario according to the sixth embodiment may select the forward radar ODM information Frt_Rdr_ODM as a highly reliable target.

Figure 12:
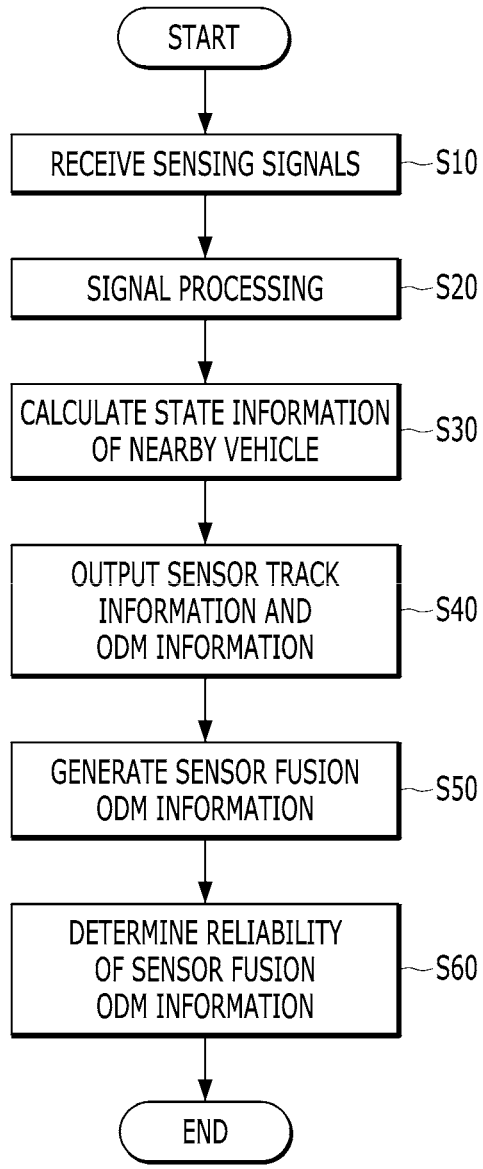
FIG. 12 is a flowchart showing an ODM information reliability determination method according to the present disclosure.

FIG. 12 is a flowchart showing an ODM information reliability determination method according to the present disclosure.

As shown in FIG. 12, the present disclosure receives a plurality of sensing signals (S10).

Here, the step of receiving the plurality of sensing signals may include receiving the signals from forward radar and lateral radar of the host vehicle.

The present disclosure performs processing of the received sensing signals (S20).

Subsequently, the present disclosure calculates state information of a nearby vehicle, which is detected from the processed signals.

Here, the step of calculating the detected state information of a nearby vehicle may include calculating detected distance information, speed information and angle information of a nearby vehicle (S30).

At this time, the detected distance information of a nearby vehicle may be calculated based on the delay time of a frequency modulated continuous wave (FMCW), the detected speed information of a nearby vehicle may be calculated based on a Doppler frequency, and the detected angle information of a nearby vehicle may be calculated based on digital beam-forming.

Next, the present disclosure outputs sensor track information and occupancy distance map (ODM) information, which includes a grid map corresponding to a vehicle detection region and an ODM object having a plurality of detection points, based on the calculated state information of a nearby vehicle (S40).

Here, the step of outputting the ODM information may include outputting a grid map, in which a forward-longitudinal direction region and a lateral direction region are divided into six regions, a longitudinal position, a lateral position, a longitudinal speed, a flag indicating presence, and probability information at a predetermined speed or less of the host vehicle.

The step of outputting the ODM information may include generating a grid map corresponding to the vehicle detection region based on lane information.

For example, the grid map may include two internal regions, two first external regions, and two second external regions.

Depending on the embodiment, the area of the grid map may be changed depending on the speed of the host vehicle.

The step of outputting the ODM information may include generating a plurality of detection points based on effective detection information received from the forward radar and the lateral radar of the host vehicle and generating at least one ODM object by clustering a group of detection points, which is determined to be an object or a vehicle, among the plurality of detection points located within the grid map.

Here, the step of generating at least one ODM object may include forming an ODM object from the detection points having the same properties at every cycle.

Further, the step of generating at least one ODM object may include managing the detection points, which are determined to be an ODM object, in a history region at every cycle and changing the maximum maintenance time of the detection points depending on the history maintenance condition.

Still further, the step of generating at least one ODM object may include determining the output value including the longitudinal and lateral distances and the longitudinal speed of the ODM object based on the hysteresis in each region of the grid map.

Next, the present disclosure may generate sensor fusion ODM information by performing sensor fusion with respect to the ODM information (S50).

Here, the step of generating the sensor fusion ODM information may include generating the sensor fusion ODM information in consideration of the accuracy of the sensor in each sensing region thereof.

For example, the step of generating the sensor fusion ODM information may include outputting ODM information of the left radar as the sensor fusion ODM information within the sensing region of the sensor, which ranges from −0.8 m to 10 m from the host vehicle in the longitudinal direction thereof and ranges from −2.2 m to −0.5 m from the host vehicle in the lateral direction thereof, outputting ODM information of the forward radar as the sensor fusion ODM information within the sensing region of the sensor, which ranges from −0.8 m to 10 m from the host vehicle in the longitudinal direction thereof and ranges from −0.5 m to 0.5 m from the host vehicle in the lateral direction thereof, outputting ODM information of the right radar as the sensor fusion ODM information within the sensing region of the sensor, which ranges from −0.8 m to 10 m from the host vehicle in the longitudinal direction thereof and ranges from 0.5 m to 2.2 m from the host vehicle in the lateral direction thereof, and outputting ODM information of the forward radar as the sensor fusion ODM information within the sensing region of the sensor, which ranges from 10 m to 20 m from the host vehicle in the longitudinal direction thereof and ranges from −2.2 m to 2.2 m from the host vehicle in the lateral direction thereof.

In addition, the present disclosure may determine the reliability of the sensor fusion ODM information by confirming the association between the sensor fusion track information and the sensor fusion ODM information (S60).

Here, the step of determining the reliability of the sensor fusion ODM information may include generating association information by confirming the association between the sensor fusion track information and the sensor fusion ODM information.

For example, the association information may be generated as a 6-bit signal, which includes right radar track information, left radar track information, forward radar track information, right radar ODM information, left radar ODM information, and forward radar ODM information.

Also, specifications for each region of ODM can be varied according to a vehicle type and a sensor specification.

In addition, there is provided a computer-readable recording medium, in which a program for implementing the ODM information reliability determination method of the ODM information reliability determination system according to an embodiment of the present disclosure is recorded, and the computer-readable recording medium may perform the process provided by the ODM information reliability determination method according to the embodiment of the present disclosure.

A vehicle according to an embodiment of the present disclosure may include a sensing device for sensing a nearby vehicle and an ODM information reliability determination system for generating sensor fusion ODM information based on information of the nearby vehicle received from the sensing device and determining the reliability of the sensor fusion ODM information. The ODM information reliability determination system may include a signal conversion unit for receiving a plurality of sensing signals and performing signal processing, a calculation unit for calculating state information of the nearby vehicle, which is detected from the processed signals, a sensor fusion track output unit for outputting sensor fusion track information based on the calculated state information of the nearby vehicle, an ODM output unit for outputting ODM information based on the calculated state information of the nearby vehicle, an ODM fusion unit for generating sensor fusion ODM information by performing sensor fusion with respect to the ODM information, and an ODM information reliability determination unit for determining the reliability of the sensor fusion ODM information by confirming the association between the sensor fusion track information and the sensor fusion ODM information.

As is apparent from the above description, according to the ODM information reliability determination system and method and the vehicle using the same related to at least one embodiment of the present disclosure constructed as described above, the reliability of sensor fusion ODM information is determined by confirming the association between sensor fusion track information and sensor fusion ODM information, thereby accurately determining a low-speed close-range cut-in vehicle. Therefore, it is possible to prevent vehicle collisions and to increase safety.

Further, in a congested expressway, the present disclosure is capable of responding to a low-speed close-range cut-in vehicle by outputting detection information of radar in a grid map form.

Still further, the present disclosure is capable of outputting five pieces of information, which include a longitudinal position, a lateral position, a longitudinal speed, a flag indicating presence, and probability information, by dividing the forward-longitudinal direction region (about 20 m) and the lateral direction region (about ±2.2 m) into six regions when the speed of the host vehicle is about 30 kph or less using the ODM output based on the detection level, rather than the track level.

Still further, the present disclosure is capable of generating sensor fusion ODM information using ODM information depending on the accuracy of the forward radar sensing region and the lateral radar sensing region.

Still further, the present disclosure is capable of determining the reliability of the sensor fusion ODM information by confirming the association between track information of another sensor and ODM information.

Still further, the present disclosure is capable of estimating heading information of a cut-in vehicle using ODM output information corresponding to the internal and external regions of the grid map, and is also capable of determining the extent to which the cut-in vehicle enters the lane of the host vehicle using the estimated information.

Still further, the present disclosure is capable of responding to a low-speed close-range cut-in vehicle using ODM information even when the longitudinal/lateral position and heading information of the sensor fusion track are not accurate, thereby preventing vehicle collisions and increasing safety.

The present disclosure described above may be implemented as a computer-readable code of a computer-readable medium in which programs are recorded. The computer-readable medium includes all kinds of recording devices in which data that may be read by a computer system is stored. Examples of the computer-readable medium may include a hard disk drive (HDD), a solid state disk (SSD), a silicon disk drive (SDD), ROM, RAM, a CD-ROM, a magnetic tape, a floppy disk, and an optical data storage device. In addition, the computer-readable recording medium includes a carrier wave (e.g. data transmission over the Internet).

It will be appreciated by those skilled in the art that the effects achievable through the present disclosure are not limited to those that have been specifically described hereinabove, and other effects of the present disclosure will be more clearly understood from the detailed description above.

Accordingly, the detailed description above is not intended to be construed to limit the present disclosure in all aspects, but is to be considered by way of example. The scope of the present disclosure should be determined by reasonable interpretation of the accompanying claims, and all equivalent modifications made without departing from the present disclosure should be included in the following claims.

The invention claimed is:

1. An occupancy distance map (ODM) information reliability determination system comprising:
    a signal conversion unit configured to receive a plurality of sensing signals and to perform signal processing;
    a calculation unit configured to calculate state information of a nearby vehicle detected from processed signals;
    a sensor fusion track output unit configured to output sensor fusion track information based on the calculated state information of the nearby vehicle;
    an ODM output unit configured to output ODM information based on the calculated state information of the nearby vehicle;
    an ODM fusion unit configured to generate sensor fusion ODM information by performing sensor fusion with respect to the ODM information; and
    an ODM information reliability determination unit configured to determine reliability of the sensor fusion ODM information by confirming association between the sensor fusion track information and the sensor fusion ODM information;

wherein when confirming the association between the sensor fusion track information and the sensor fusion ODM information, the ODM information reliability determination unit generates association information by confirming the association between the sensor fusion track information and the sensor fusion ODM information.

2. The ODM information reliability determination system according to claim 1, wherein the signal conversion unit receives the plurality of sensing signals from forward radar and lateral radar of a host vehicle.

3. The ODM information reliability determination system according to claim 1, wherein, when calculating the detected state information of the nearby vehicle, the calculation unit calculates detected distance information, speed information and angle information of the nearby vehicle.

4. The ODM information reliability determination system according to claim 1, wherein, when outputting the ODM information, the ODM output unit outputs a grid map, in which a forward-longitudinal direction region and a lateral direction region are divided into six regions, a longitudinal position, a lateral position, a longitudinal speed, a flag indicating presence, and probability information at a predetermined speed or less of a host vehicle.

5. The ODM information reliability determination system according to claim 1, wherein, when outputting the ODM information, the ODM output unit generates a plurality of detection points based on effective detection information received from forward radar and lateral radar of a host vehicle, and generates at least one ODM object by clustering a group of detection points, which is determined to be an object or a vehicle, among the plurality of detection points located within a grid map.

6. The ODM information reliability determination system according to claim 1, wherein, when generating the sensor fusion ODM information, the ODM fusion unit generates the sensor fusion ODM information in consideration of accuracy of a sensor in each sensing region of the sensor.

7. The ODM information reliability determination system according to claim 6, wherein the ODM fusion unit:

outputs ODM information of left radar as sensor fusion ODM information within a sensing region of the sensor, the sensing region ranging from −0.8 m to 10 m from a host vehicle in a longitudinal direction thereof and ranging from −2.2 m to −0.5 m from the host vehicle in a lateral direction thereof;

outputs ODM information of forward radar as sensor fusion ODM information within a sensing region of the sensor, the sensing region ranging from −0.8 m to 10 m from the host vehicle in the longitudinal direction thereof and ranging from −0.5 m to 0.5 m from the host vehicle in the lateral direction thereof;

outputs ODM information of right radar as sensor fusion ODM information within a sensing region of the sensor, the sensing region ranging from −0.8 m to 10 m from the host vehicle in the longitudinal direction thereof and ranging from 0.5 m to 2.2 m from the host vehicle in the lateral direction thereof; and outputs ODM information of the forward radar as sensor fusion ODM information within a sensing region of the sensor, the sensing region ranging from 10 m to 20 m from the host vehicle in the longitudinal direction thereof and ranging from −2.2 m to 2.2 m from the host vehicle in the lateral direction thereof.

8. The ODM information reliability determination system according to claim 1, wherein the association information is generated as a 6-bit signal, the 6-bit signal comprising right radar track information, left radar track information, forward radar track information, right radar ODM information, left radar ODM information, and forward radar ODM information.

9. An ODM information reliability determination method comprising:

receiving a plurality of sensing signals;

processing the received sensing signals;

calculating state information of a nearby vehicle detected from processed signals;

outputting sensor track information and ODM information based on the calculated state information of the nearby vehicle;

generating sensor fusion ODM information by performing sensor fusion with respect to the ODM information; and determining reliability of the sensor fusion ODM information by confirming association between the sensor fusion track information and the sensor fusion ODM information;

wherein the determining reliability of the sensor fusion ODM information comprises generating association information by confirming the association between the sensor fusion track information and the sensor fusion ODM information.

10. The ODM information reliability determination method according to claim 9, wherein the receiving the plurality of sensing signals comprises receiving the sensing signals from forward radar and lateral radar of a host vehicle.

11. The ODM information reliability determination method according to claim 9, wherein the calculating the detected state information of the nearby vehicle comprises calculating detected distance information, speed information and angle information of the nearby vehicle.

12. The ODM information reliability determination method according to claim 9, wherein the outputting the ODM information comprises outputting a grid map, in which a forward-longitudinal direction region and a lateral direction region are divided into six regions, a longitudinal position, a lateral position, a longitudinal speed, a flag indicating presence, and probability information at a predetermined speed or less of a host vehicle.

13. The ODM information reliability determination method according to claim 9, wherein the outputting the ODM information comprises generating a plurality of detection points based on effective detection information received from forward radar and lateral radar of a host vehicle and generating at least one ODM object by clustering a group of detection points, which is determined to be an object or a vehicle, among the plurality of detection points located within a grid map.

14. The ODM information reliability determination method according to claim 9, wherein the generating the sensor fusion ODM information comprises generating the sensor fusion ODM information in consideration of accuracy of a sensor in each sensing region of the sensor.

15. The ODM information reliability determination method according to claim 14, wherein the generating the sensor fusion ODM information comprises:

outputting ODM information of left radar as sensor fusion ODM information within a sensing region of the sensor, the sensing region ranging from −0.8 m to 10 m from a host vehicle in a longitudinal direction thereof and ranging from −2.2 m to −0.5 m from the host vehicle in a lateral direction thereof;

outputting ODM information of forward radar as sensor fusion ODM information within a sensing region of the sensor, the sensing region ranging from −0.8 m to 10 m from the host vehicle in the longitudinal direction thereof and ranging from −0.5 m to 0.5 m from the host vehicle in the lateral direction thereof;

outputting ODM information of right radar as sensor fusion ODM information within a sensing region of the sensor, the sensing region ranging from −0.8 m to 10 m from the host vehicle in the longitudinal direction thereof and ranging from 0.5 m to 2.2 m from the host vehicle in the lateral direction thereof; and outputting ODM information of the forward radar as sensor fusion ODM information within a sensing region of the sensor, the sensing region ranging from 10 m to 20 m from the host vehicle in the longitudinal direction thereof and ranging from −2.2 m to 2.2 m from the host vehicle in the lateral direction thereof.

16. The ODM information reliability determination method according to claim 9, wherein the association information is generated as a 6-bit signal, the 6-bit signal comprising right radar track information, left radar track information, forward radar track information, right radar ODM information, left radar ODM information, and forward radar ODM information.

17. A vehicle comprising:
a sensing device configured to sense a nearby vehicle; and
an occupancy distance map (ODM) information reliability determination system configured to generate sensor fusion ODM information based on information of the nearby vehicle received from the sensing device and to determine reliability of the sensor fusion ODM information, wherein the ODM information reliability determination system comprises:
a signal conversion unit configured to receive a plurality of sensing signals and to perform signal processing;
a calculation unit configured to calculate state information of a nearby vehicle detected from processed signals;
a sensor fusion track output unit configured to output sensor fusion track information based on the calculated state information of the nearby vehicle;
an ODM output unit configured to output ODM information based on the calculated state information of the nearby vehicle;
an ODM fusion unit configured to generate sensor fusion ODM information by performing sensor fusion with respect to the ODM information; and
an ODM information reliability determination unit configured to determine reliability of the sensor fusion ODM information by confirming association between the sensor fusion track information and the sensor fusion ODM information;

wherein when confirming the association between the sensor track information and the sensor fusion ODM information, the ODM information reliability determination unit generates association information by confirming the association between the sensor fusion track information and the sensor fusion ODM information.

* * * * *